Patented Dec. 30, 1952

2,623,906

UNITED STATES PATENT OFFICE 2,623,906

PREPARATION OF ORGANIC HYDROXY-CONTAINING COMPOUNDS BY REACTING ALCOHOLS WITH CARBON MONOXIDE AND HYDROGEN

William F. Gresham, Wilmington, Del., assignor to E. I. du Pont de Nemours & Company, Wilmington, Del., a corporation of Delaware No Drawing. Application June 16, 1948, Serial No. 33,437

8 Claims. (Cl. 260—615)

1

This invention relates to the synthesis of monofunctional and polyfunctional oxygen-containing organic compounds, and more particularly to the preparation of oxygen-containing organic compounds, including ethers of polyhydric alcohols, by novel reactions between primary, secondary, or tertiary alcohols, carbon monoxide and hydrogen.

It has been known for many years that monofunctional compounds such as methanol can be obtained by reaction between carbon monoxide and hydrogen at elevated pressures e. g., at pressures up to about 1000 atmospheres. In the copending application of W. F. Gresham, S. N. 793,521, filed December 23, 1947, now abandoned, it is disclosed that at pressures of about 1500 to 5000 atmospheres, in the presence of specific catalysts, e. g., catalysts containing cobalt, the reaction between carbon monoxide and hydrogen follows a new course, and gives excellent yields of polyhydric alcohols and formate esters of polyhydric alcohols.

An object of this invention is to provide novel features in the synthesis of organic compounds at very high pressures. Another object is to provide a process for the preparation of oxygen-containing organic compounds by reaction between an oxide of carbon, hydrogen, and a primary, secondary, or tertiary alcohol at pressures of at least 1500 atmospheres. Another object of the invention is to provide a novel process for the manufacture of glycol ethers. Still another object is to provide a process for the manufacture of primary alcohols having at least one more carbon atom per molecule than the alcohol employed as a reactant, by reaction between an alcohol, carbon monoxide and hydrogen. Other objects of the invention will appear hereinafter.

It has been discovered in accordance with this invention that at pressures exceeding 1000 atmospheres, and preferably at pressures of at least 1500 atmospheres, in the presence of a cobalt-containing catalyst, primary, secondary, and tertiary alcohols react with carbon monoxide (or carbon dioxide) and hydrogen to form glycol ethers, and also monohydric alcohols containing at least one more carbon atom per molecule than the alcohol employed as a reactant. The present invention thus provides an entirely new method for the preparation of glycol ethers, and various other oxygen-containing organic products. In specific embodiments (using methanol and butanol, respectively, as illustrations) the

2 novel reactions which take place in accordance with this invention include the following:

1.
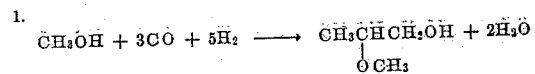

2.

3. 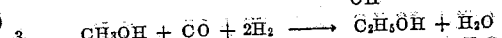
4. 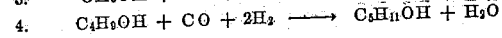

5.
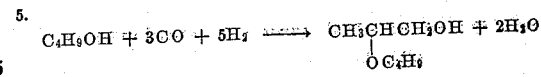

6.
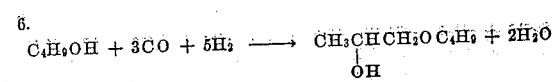

It appears that each of these types of reactions, as well as certain others, occur at the same time, under conditions hereinafter disclosed. The initial reaction products react further, in a similar way, giving rise to the formation of high molecular weight hydroxyl compounds, especially if relatively long reaction times are used. A similar result can be achieved by recycling the alcohols initially obtained; the recycling can be repeated if desired, whereby alcohols of any desired molecular weight range can be obtained.

In the reactions which, according to the present discovery, take place between an alcohol, an oxide of carbon, and hydrogen, a pressure exceeding 1000 atmospheres, and preferably at least about 1500 atmospheres, is required. Excellent results are obtained at a pressure of about 1800 atmospheres or higher. From a practical standpoint it is generally desirable to carry out these novel reactions at pressures within the range of about 1800 to 3000 atmospheres, but pressures as high as 5000 atmospheres may be employed if desired. Pressures in excess of 5000 atmospheres give outstanding results, but the increased cost of the equipment may be such as to make it generally less favorable from an economic standpoint to employ pressures exceeding 5000 atmospheres.

The reaction between an alcohol, an oxide of carbon (i. e. carbon monoxide or carbon dioxide) and hydrogen in accordance with this invention may be carried out either in the vapor phase or in the liquid phase. Inert diluents may be employed if desired, such as inert organic diluents or mixtures thereof e. g., inert hydrocarbons, ethers, and the like. Moreover, water, or mixtures of water with water-soluble or water-insoluble solvents, may be employed as diluents if desired.

Either heterogeneous or homogeneous reaction mixtures may be employed in the practice of the invention. For example, catalysts which are soluble in at least one of the ingredients of the reaction mixture may be employed effectively. It is not essential, however, that the catalyst be in the dissolved state, for satisfactory results are also obtained with catalysts which are not homogeneously distributed throughout the reaction mixture or throughout any particular ingredient thereof. Solid catalysts which remain in place during the course of the reaction may be employed satisfactorily. Suspensions of catalyst in liquid or gaseous media may be employed. Outstanding results are obtained with catalysts containing cobalt, and it evidently is not critical that the cobalt be combined in any specific form. Cobalt carbonyl and cobalt carbonyl hydride may be employed effectively as catalysts in the practice of the invention. Metallic cobalt is also effective. It is frequently preferred to employ a soluble compound of cobalt, such as an organic or inorganic cobalt salt. Cobalt salts give excellent results when dissolved in the alcohol which undergoes reaction. Outstanding catalysts include cobalt salts of the lower aliphatic acids, such as cobalt acetate, cobalt propionate, cobalt isobutyrate, etc., as well as cobalt salts of higher molecular weight acids, e. g., cobalt naphthenate, cobalt stearate, and cobalt oleate. The quantity of catalyst which is employed is not highly critical, but it is generally desirable to use a sufficient quantity of catalyst to effect a reasonably rapid reaction, preferably at least about 0.001%, and usually about 0.001% to about 30% by weight, based on the weight of cobalt per unit of weight of the alcohol present.

The temperatures which may be employed in the practice of the invention vary rather widely and in preferred embodiments the optimum temperatures are determined in part by the nature of the alcohol employed. In general, the invention may be practiced at a temperature in the range of 100° to 350° C. The optimum temperature for the reaction between ethanol, carbon monoxide, and hydrogen is slightly above the optimum temperature for the corresponding reaction between methanol, carbon monoxide and hydrogen. The alcohols higher than ethanol require a somewhat higher optimum reaction temperature. Also, in general, the secondary and tertiary alcohols react somewhat more readily than do the primary alcohols having the same number of carbon atoms. The reaction is considerably more sluggish with relatively high molecular weight alcohols, than with hydroxyalkanes having from 1 to 9 carbon atoms per molecule, and is in fact relatively slow when nonyl alcohol (3,5,5-trimethylhexanol-1) is employed, even at a temperature as high as about 280° C. With the lower alcohols, the reaction is quite rapid, a reaction time of about 5 minutes being sufficiently long. When the alcohol reactant is methanol, ethanol, ethylene glycol (which yields a reaction product containing glycerine under the herein disclosed conditions) n-propanol, isopropanol or any of the butanols, temperatures of at least about 150° C. are most frequently employed, since best results are obtained at these elevated temperatures, in reaction times preferably not in excess of about 15 minutes.

The relative amounts of carbon monoxide and hydrogen which are present initially in the reaction mixture in the practice of the invention may be varied over a wide range but it is generally preferred that the mole ratio of $CO:H_2$ be within the range of 10:1 to 1:10, excellent results being obtained when the mole ratio of $CO:H_2$ is within the range of 3:1 to 1:3.

It is, of course, to be understood that reaction mixtures which give rise to the formation of carbon monoxide and hydrogen under the reaction conditions may be employed, instead of the mixtures of carbon monoxide and hydrogen which are used in preferred embodiments in the practice of the invention. For example, it is possible to employ a reaction mixture containing carbon dioxide and hydrogen, or mixtures of carbon dioxide and carbon monoxide with hydrogen. Other mixtures such as carbon monoxide and steam may be used if desired. Metal carbonyls (especially cobalt carbonyls) and complexes of such carbonyls may be used to supply the carbon monoxide reactant, and the quantity of metal carbonyl thus employed may be varied over the widest possible range; in certain instances, this tends to lower somewhat the pressure which is required for the formation of the desired reaction products in the practice of the invention.

The process of the invention may be carried out either continuously or batchwise. Optimum results are generally obtained at the shortest reaction times capable of giving an appreciable conversion to the desired product. When an optimum yield of glycol ethers is desired, it is preferable to operate at relatively low conversions. In the continuous process it is generally desirable to recirculate the unreacted gases, preferably with make-up alcohol, carbon monoxide and hydrogen. In one preferred method of practicing the invention a high pressure separator is employed to remove the glycol ethers and other reaction products from the reaction mixture. Other methods known in the art may be employed for separating from the reaction mixture the glycol ethers, higher alcohols, and other products, which are formed. Suitable methods include distillation, fractional condensation, extraction, etc.

Since the formation of glycol ethers, higher alcohols, etc. from alcohols, carbon monoxide, and hydrogen in accordance with this invention is an exothermic process, suitable means should be provided for the withdrawal of heat from the reaction mixture while the reaction is in progress. This removal of heat can be accomplished by any convenient method and in a specific embodiment is effected by carrying out, simultaneously with the reaction between the alcohol, oxide of carbon, and hydrogen an endothermic process under such conditions that the heat evolved by the exothermic reatcion is at least in part absorbed by the endothermic process.

The reaction between the alcoholic reactant, oxide of carbon and hydrogen in accordance with this invention can be carried out in any suitable reaction vessel capable of withstanding very high pressures. Reaction vessels which are made of or lined with materials which remain inert in the presence of the reaction mixture are preferably employed, i. e., the reaction vessel may be made of steel which, if desired, can be lined with such inert materials as silver, copper, platinum, gold, platinum-iridium alloy, platinum-ruthenium alloy, refractories, etc.

The invention is illustrated further by means of the following examples.

*Example 1.*—A mixture containing 74 grams n-butanol and 2 grams of anhydrous cobaltous acetate was subjected to reaction with carbon monoxide and hydrogen (mole ratio $CO:H_2=1:1$) at 253° to 255° C. for 10 minutes under a pressure of 2900 to 3000 atmospheres. During the reaction which took place under these conditions the weight of liquid reaction mixture increased to about 125 grams. Distillation of this liquid gave a fraction boiling below 84° C., which fraction contained n-butyl formate, n-butanol and water. The next fraction was a water-n-butanol azeotrope; approximately 16 grams of water was recovered; the total amount of n-butanol recovered was 26% by weight of the quantity of n-butanol initially charged, and the weight of higher boiling products formed was 55.5 grams. Analysis of the higher boiling products showed the presence of n-amyl alcohol, propylene glycol-alpha-n-butyl ether and propylene glycol-beta-n-butyl ether as the main ingredients, together with minor amounts of propylene glycol, ethylene glycol, and propylene glycol di-n-butyl ether.

*Example 2.*—Three different experiments were made which show the effect of variations in $CO:H_2$ ratio on the reaction between methanol, carbon monoxide and hydrogen. In each of these experiments a mixture containing 96 grams of methanol, and 2 grams of anhydrous cobaltous acetate was heated at 200° C. for 5 minutes under 1800 to 2000 atmospheres pressure with a carbon monoxide-hydrogen mixture. In the first experiment the $CO:H_2$ ratio was initially 1:3. The resulting product upon distillation gave 66.8 grams of a recovered methanol fraction which contained some methyl acetate. The next higher boiling fraction (B. P. 69° to 99° C.) weighed 27.1 grams, of which 16.2 grams could be salted out as an organic layer. The reaction product contained about 4.5 grams of higher boiling material. In the second experiment equimolar quantities of carbon monoxide and hydrogen were initially present. The reaction product upon distillation yielded 27.8 grams of low boilers, B. P. 36° to 63° C., 20.2 grams of methanol, 44 grams of material boiling from 70° to 99° C., of which 24 grams could be salted out as an organic layer, and 12.7 grams of higher boiling products. In the third experiment the initial $CO:H_2$ ratio was 3:1. Distillation of the reaction product gave 32.7 grams of low boiling distillate, B. P. 40° to 63° C., 10 grams of methanol, 60 grams of material having a boiling range of from 66° to 99° C., of which about 39 grams could be salted out as an organic layer, and 8.2 grams of higher boiling product. The fractions having a boiling range above methanol and distilling azeotropically with water were combined, and the composite mixture, after being dried, was hydrogenated at 180° to 195° C. and 425 to 700 atmospheres hydrogen pressure using a nickel-on-kieselguhr catalyst in order to convert a small quantity of aldehydes present to alcohols. The resulting mixture was fractionally distilled. Of the material boiling above methanol about 20% by weight was ethanol. About 12% boiled in the range of 80° to 116.5° and was mainly a mixture of alcohols. The main fraction, about 42%, had a boiling range of 116.5° to 128° C. and was a mixture of propylene glycol-alpha-methyl ether and propylene glycol-beta-methyl ether. About 24% had a boiling range higher than the boiling point of the propylene glycol monomethyl ethers.

*Example 3.*—A mixture containing 74 grams of tertiary butanol and 2 grams of anhydrous cobaltous acetate was heated with a carbon monoxide-hydrogen mixture (mole ratio 1:1) in a silver lined rocker tube at 210° to 220° C. for 10 minutes under a pressure of 2900 to 3000 atmospheres. Distillation of the resulting product gave 43.1 grams of material boiling within the C5 alcohol range which was mainly isoamyl alcohol and alcohol formates. About 14.2 grams of higher boiling product also was obtained.

*Example 4.*—A mixture containing 74 grams of tertiary butanol and 0.5 gram of cobaltous acetate was heated with carbon monoxide-hydrogen mixture (mole ratio 1:1) at 250° C. for 10 minutes under a pressure of 1950 to 2000 atmospheres. An isoamyl alcohol fraction was distilled from the resulting product in quantity corresponding to a conversion of 38.5%. This isoamyl alcohol fraction contained about 10% of tertiary butyl formate and isoamyl formate. About 4.2 grams of higher boiling product also was obtained. A similar result is obtained using cobalt naphthenate, cobalt propionate or finely divided cobalt metal as catalyst.

*Example 5.*—A mixture containing 36 grams of ethylene glycol, and 1 gram of cobaltous acetate was heated with $CO+H_2$ (mole ratio 2:3) in a silver-lined reaction vessel at 270° to 273° C. under 2800 to 3000 atmospheres pressure for 10 minutes. The resulting liquid product weighed 62.7 grams. Distillation of this product gave 26.7 grams of low boiling liquid (B. P. 73° to 125° C./1 atmosphere) and 29.1 grams of a high-boiling fraction (B. P. 67° C./2 mm. to 165° C./7 mm.). About one fourth of this high-boiling fraction was water-soluble material which distilled at a temperature higher than the boiling point of ethylene glycol.

Various changes may be made in the method hereinbefore described without departing from this invention or sacrificing any of the advantages that may be derived therefrom. The examples given above are illustrative only and do not necessarily limit the invention. Since many different embodiments of the invention will occur to those who are skilled in the art, it is to be understood that I limit myself only as set forth in the following claims.

I claim:

1. A process for the synthesis of organic oxygen-containing compounds which comprises introducing into a pressure resistant vessel reactants consisting of a hydroxyalkane, carbon monoxide and hydrogen, reacting the said hydroxyl-containing compound with carbon monoxide and hydrogen under a pressure of 1800 to 5000 atmospheres in the presence of a cobalt-containing catalyst, at a reaction temperature within the range of 100° to 350° C., whereby simultaneous reaction between the said hydroxyl-containing compound, carbon monoxide and hydrogen takes place with the formation of a glycol ether, and thereafter separating from the resulting mixture, the glycol ether produced by the said reaction.

2. The process of claim 1 in which the said hydroxyalkane is methanol.

3. The process of claim 1 in which the said hydroxyalkane is n-butanol.

4. The process of claim 1 in which the said hydroxyalkane is tertiary butanol.

5. A process for preparing propylene glycol monomethyl ethers which comprises heating reactants consisting of methanol, carbon monoxide and hydrogen under a pressure of 1800 to 5000 atmospheres at a reaction temperature within the range of 100° to 350° C., in the presence of a cobalt salt catalyst dissolved in the said methanol, whereby propylene glycol monomethyl ethers are produced, and thereafter separating the said propylene glycol monomethyl ethers from the resulting mixture.

6. The process of claim 5 in which the said cobalt salt is a cobalt acetate.

7. The process of claim 5 in which the reaction time is from 5 to 15 minutes.

8. The process of claim 5 in which the quantity of catalyst is such that the reaction mixture contains at least 0.001% by weight of cobalt, based on the weight of the methanol present.

WILLIAM F. GRESHAM.

REFERENCES CITED

The following references are of record in the file of this patent:

UNITED STATES PATENTS

| Number | Name | Date |
|---|---|---|
| 1,562,480 | Weitzel | Nov. 24, 1925 |
| 1,770,165 | Patart | July 8, 1930 |
| 1,782,591 | Weitzel | Nov. 25, 1930 |
| 1,996,101 | Dreyfus | Apr. 2, 1935 |
| 2,429,878 | Gresham | Oct. 28, 1947 |
| 2,437,600 | Gresham et al. | Mar. 9, 1948 |
| 2,449,470 | Gresham et al. | Sept. 14, 1948 |
| 2,457,204 | Brooks | Dec. 28, 1948 |
| 2,462,738 | Gresham | Feb. 22, 1949 |
| 2,491,915 | Barrick | Dec. 20, 1949 |